(12) United States Patent
Xu et al.

(10) Patent No.: US 12,173,144 B2
(45) Date of Patent: Dec. 24, 2024

(54) RUBBER COMPOSITION, AND CONVEYOR BELT USING THE SAME

(71) Applicants: HANGZHOU XINGLU TECHNOLOGIES CO., LTD, Zhejinag (CN); SHAOXING PINGHE NEW MATERIAL TECHNOLOGY CO., LTD., Shaoxing (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGIES CO., LTD, Zhejiang (CN); SHAOXING PINGHE NEW MATERIAL TECHNOLOGY CO., LTD., Shaoxing (CN)

( * ) Notice: Subject to any disclaimer, the term of this patent is extended or adjusted under 35 U.S.C. 154(b) by 573 days.

(21) Appl. No.: 16/477,621

(22) PCT Filed: Jan. 12, 2018

(86) PCT No.: PCT/CN2018/072356
§ 371 (c)(1),
(2) Date: Jul. 12, 2019

(87) PCT Pub. No.: WO2018/130189
PCT Pub. Date: Jul. 19, 2018

(65) Prior Publication Data
US 2019/0367717 A1 Dec. 5, 2019

(30) Foreign Application Priority Data

Jan. 13, 2017 (CN) .......................... 201710024893.7
Jan. 10, 2018 (CN) .......................... 201810020824.3

(51) Int. Cl.
| | |
|---|---|
| C08L 23/16 | (2006.01) |
| B29D 29/06 | (2006.01) |
| B65G 15/32 | (2006.01) |
| C08K 3/04 | (2006.01) |
| C08K 3/06 | (2006.01) |
| C08K 3/08 | (2006.01) |
| C08K 3/22 | (2006.01) |
| C08K 3/26 | (2006.01) |
| C08K 3/34 | (2006.01) |
| C08K 5/01 | (2006.01) |
| C08K 5/09 | (2006.01) |
| C08K 5/14 | (2006.01) |
| C08K 5/3492 | (2006.01) |
| C08K 13/02 | (2006.01) |
| C08L 23/06 | (2006.01) |
| C08L 23/08 | (2006.01) |

(52) U.S. Cl.
CPC .............. *C08L 23/16* (2013.01); *B29D 29/06* (2013.01); *B65G 15/32* (2013.01); *C08K 3/04* (2013.01); *C08K 3/06* (2013.01); *C08K 3/22* (2013.01); *C08K 3/346* (2013.01); *C08K 5/01* (2013.01); *C08K 5/09* (2013.01); *C08K 5/14* (2013.01); *C08K 5/3492* (2013.01); *C08K 13/02* (2013.01); *C08L 23/06* (2013.01); *C08L 23/08* (2013.01); *C08K 2003/0893* (2013.01); *C08K 2003/222* (2013.01); *C08K 2003/265* (2013.01); *C08K 2003/267* (2013.01); *C08L 2201/08* (2013.01); *C08L 2205/03* (2013.01)

(58) Field of Classification Search
CPC .......... C08L 23/08; C08L 23/16; C08L 23/06; C08L 23/04; C08L 91/00; C08L 71/02; C08K 5/0016; C08K 3/22; C08K 3/346; C08K 5/0025; C08K 3/013; C08K 5/34924; C08K 5/14; C08K 3/04; C08K 3/011; C08K 5/005; C08K 3/06; C08K 3/26; C08K 5/09; C08K 2003/265; C08K 2003/2217; C08K 2003/2206; C08K 2003/2296; C08K 2003/222; C08K 2201/014; B29D 29/06; B65G 15/32
See application file for complete search history.

(56) References Cited

U.S. PATENT DOCUMENTS

| | | |
|---|---|---|
| 3,645,992 A | 2/1972 | Elston |
| 6,103,658 A | 8/2000 | Mackenzie et al. |

(Continued)

FOREIGN PATENT DOCUMENTS

| | | |
|---|---|---|
| CN | 101028888 A | 9/2007 |
| CN | 101531725 A | 9/2009 |

(Continued)

OTHER PUBLICATIONS

SIPO, International Search Report issued in IA Application No. PCT/CN2018/072356, mailed Apr. 19, 2018.

*Primary Examiner* — Marc S Zimmer
*Assistant Examiner* — Jeffrey S Lenihan
(74) *Attorney, Agent, or Firm* — LKGlobal | Lorenz & Kopf, LLP

(57) ABSTRACT

The present invention discloses a rubber composition comprising, in parts by weight, 100 parts of a rubber matrix, 1.5 to 9 parts of a crosslinking agent, 0.2 to 9 parts of an assistant crosslinking agent, 40 to 170 parts of a reinforcing filler, 6 to 93 parts of a plasticizer and 3 to 25 parts of a metal oxide. The rubber matrix comprises a branched polyethylene with a content represented as A, in which 0<A≤100 parts, an EPM with a content represented as B, in which 0≤B<100 parts, and an EPDM with a content represented as C, in which 0≤C<100 parts. The present invention provides a rubber composition which is excellent in heat resistance and mechanical properties and is useful in a cover rubber of a conveyor belt.

19 Claims, No Drawings

(56) References Cited

U.S. PATENT DOCUMENTS

| | | | |
|---|---|---|---|
| 6,433,080 B1 * | 8/2002 | Fujiki | C08L 21/00 |
| | | | 524/378 |
| 6,660,677 B1 | 12/2003 | Mackenzie et al. | |
| 11,479,661 B2 * | 10/2022 | Xu | E01D 19/041 |
| 11,634,566 B2 * | 4/2023 | Xu | B60C 1/0016 |
| | | | 525/515 |
| 2014/0287178 A1 | 9/2014 | Clayfield et al. | |
| 2016/0355622 A1 | 12/2016 | Ichino et al. | |

FOREIGN PATENT DOCUMENTS

| | | | |
|---|---|---|---|
| CN | 101812145 A | | 8/2010 |
| CN | 102827312 A | | 12/2012 |
| CN | 102898730 A | | 1/2013 |
| CN | 103975013 A | | 8/2014 |
| CN | 103980596 A | * | 8/2014 |
| CN | 104312018 A | | 1/2015 |
| CN | 104926962 A | | 9/2015 |
| CN | 105017658 A | * | 11/2015 |
| CN | 105713301 A | | 6/2016 |
| CN | 107556577 A | * | 1/2018 |
| EP | 0050962 A1 | * | 5/1982 |
| WO | WO03018078 A1 | * | 3/2003 |
| WO | 2015122495 A1 | | 8/2015 |

* cited by examiner

RUBBER COMPOSITION, AND CONVEYOR BELT USING THE SAME

CROSS REFERENCE TO RELATED APPLICATIONS

The present application is the U.S. national phase of and claims priority to International Patent Application No. PCT/CN2018/072356 filed Jan. 12, 2018, which claims the benefit of priority from China National application Ser. No. 201710024893.7, filed on Jan. 13, 2017 and China National application Ser. No. 201810020824.3, filed on Jan. 10, 2018, the entire content of each of which is incorporated herein by reference into the present disclosure as if fully set forth herein.

TECHNICAL FIELD

The present invention relates to the technical field of rubbers, in particular to a rubber composition, and a processing method thereof, and further to a conveyor belt using the rubber composition and a production method thereof.

BACKGROUND

In order to meet the high temperature resistance requirement, the rubber compound is partially or fully an ethylene-propylene rubber of high heat resistance in various portions (especially the cover layer in direct contact with the material) of the conveyor belts used in high-temperature environments. However, the tensile strength of the ethylene-propylene rubber is significantly lower than that of the substituted styrene-butadiene rubber or natural rubber. Particularly, the defect of low strength becomes more obvious when a large amount of ethylene propylene monomer (EPM) is used to satisfy better heat resistance. Therefore, the use of ethylene-propylene rubber as a cover rubber for heat-resistant conveyor belts limits the scope of application of such heat-resistant conveyor belts.

Chinese Patent Publication No. CN101028888B discloses a high-temperature resistant conveyor belt, which adopts a technology mainly comprising adding EPM or EPM and ethylene-propylene-diene monomer (EPDM) to an internal mixer, pre-pressing, and mixing; adding a heat conducting agent and an anti-aging agent, and mixing; then adding a reinforcing agent, a softener, and aramid staple fibers to the rubber compound, mixing, and processing them into a stage I rubber mix; adding the rubber mix to an internal mixer, performing stage II mixing, during which a cross-linking agent and an auxiliary cross-linking agent are added, and discharging after mixing uniformly; then hot milling and calendering the final rubber compound into a rubber sheet; and laminating the rubber sheet to and forming with a tensile canvas belt blank, roll vulcanizing, trimming and inspecting, to obtain a finished product. However, the drawback of this rubber is that there is no mention of an improvement on the mechanical properties of the heat-resistant conveyor belt, and the introduction of staple fibers may increase the processing difficulty and increases the production cost.

Chinese Patent Publication No. CN102898730B also discloses a rubber material for high-temperature resistant conveyor belt and a manufacturing method thereof. The material comprises EPDM, carbon black, nano-zinc oxide, stearic acid, dicumyl peroxide, a co-crosslinking agent, a crosslinking agent, the accelerator CZ, the accelerator MDB, the anti-aging agent MB, the anti-aging agent 264, the anti-aging agent RD, the anti-aging agent 4020, polybutene, the tackifying resin PN-110, the tackifier reactive methacrylate, magnesia, a dispersant, and special paraffinic oil. In this conveyor belt, a co-crosslinking agent, a crosslinking agent, the accelerator MDB and special paraffinic oil are added on the basis of the conventional formulation, so that the produced conveyor belt has better high-temperature resistance. The defects of this kind of rubber are that only the high-temperature resistance is focused on, and the mechanical strength of the heat-resistant conveyor belt is not significantly improved.

Chinese Patent Publication No. CN104312018B discloses a cover rubber for a heat-resistant conveyor belt, which comprises EPM, EPDM of low Mooney viscosity, high abrasion-resistant carbon black, zinc methacrylate, silica, paraffin, an adhesion promoter, resorcinol, an anti-aging agent and other components. The present invention increases the heat resistance of the conveyor belt, but does not significantly improve the mechanical strength of the heat-resistant conveyor belt.

Ethylene-propylene rubbers are a kind of synthetic rubbers with a saturated molecular backbone, and include EPM and EPDM, both of which have good aging resistance. EPDM is commonly used in the ethylene-propylene rubber products. However, since EPDM contains a third monomer with a molecular chain having a double bond and EPM has a completely saturated molecular chain, EPM has more excellent aging resistance. Therefore, in a situation where a higher requirement is raised for the aging resistance, it is a common technical solution to use EPM in combination to improve the aging resistance of EPDM. However, the mechanical strength of EPM is low, which affects the overall physical and mechanical properties.

EPM is a copolymer of ethylene and propylene, which is a copolymer of ethylene and an $\alpha$-olefin. The copolymer of ethylene and an $\alpha$-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/$\alpha$-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/$\alpha$-olefin copolymers.

In the prior art, the $\alpha$-olefin in the common ethylene/$\alpha$-olefin copolymers may include, in addition to propylene, an $\alpha$-olefin having a carbon number of not less than 4, which may be selected from a $C_4$-$C_{20}$ $\alpha$-olefin, and is generally selected from 1-butene, 1-hexene and 1-octene. If the degree of branching of an ethylene/$\alpha$-olefin copolymer is too low, the melting point and crystallinity are too high, so it is not suitable for use as a rubber component. If the degree of branching is too high, the content of $\alpha$-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting point. Due to their proper crystallinity and melting point, some polyolefin elastomer brands can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentages by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after cross-linking. Among common cross-linking methods for ethylene-propylene rubbers, peroxide cross-linking or irradiation cross-linking can be suitably used for a copolymer of ethylene and an α-olefin, both of which mainly comprising: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and the free radical reaction is difficult to occur, resulting in difficulty in crosslinking, thus affecting the processing efficiency and product performance.

Therefore, there is currently a need for a better technical solution, which can improve the aging resistance of ethylene-propylene rubbers while the rubber composition has good physical and mechanical properties and cross-linking performances, and is expected to have good performances with respect to particular functional indices (for example, compression set resistance) needed by rubber products such as conveyor belt.

SUMMARY

In view of the problems existing in the prior art, the present invention provides a new formulation of a rubber composition, and a processing method for obtaining the rubber composition, in which branched polyethylene with a degree of branching of not less than 50 branches/1000 carbon atoms is used to replace a part or all of the ethylene-propylene rubber, and peroxide vulcanization is adopted The present invention also provides a method for producing a high-temperature resistant and high-strength conveyor belt using the rubber composition, thereby overcoming the problem that the strength performance of the conveyor belt produced with the existing rubbers is less good.

In order to achieve the above object, the following technical solution is adopted in the present invention. A rubber composition comprises, in parts by weight, 100 parts of a rubber matrix, and essential components. The rubber matrix comprises, in parts by weight, a branched polyethylene with a content represented as A, in which $0<A\leq100$ parts, an EPM with a content represented as B, in which $0\leq B<100$ parts, and an EPDM with a content represented as C, in which $0\leq C<100$ parts; and based on 100 parts by weight of the rubber matrix, the essential components comprises 1.5-9 parts of a crosslinking agent, 0.2-9 parts of an auxiliary crosslinking agent, 40-170 parts of a reinforcing filler, 6-93 parts of a plasticizer, and 3-25 parts of a metal oxide, where the branched polyethylene has a degree of branching of not less than 50 branches/1000 carbon atoms, a weight average molecular weight of not less than 50,000, and a Mooney viscosity ML (1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which may be POE. Although POE performs well in physical and mechanical properties and aging resistance, the cross-linking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1 to 6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching is between that of POE and EPM, constituting a new technical solution that is different from the prior art. Therefore, the rubber matrix of present invention has both excellent aging resistance and good cross-linking performances.

The cross-linking performances include factors such as crosslinking density and crosslinking rate, and are the specific manifestations of the cross-linking ability of the rubber matrix in the processing process.

The branched polyethylene used in the present invention preferably has a methyl branch content of 40% or more or 50% or more, and has a similarity in structure with EPM. In terms of the crosslinking ability, the degree of branching (the content of tertiary carbon atom) and the steric hindrance around the tertiary carbon atom are the two main factors affecting the crosslinking ability of a saturated polyolefin. Compared with EPM, the branched polyethylene used in the present invention has a low degree of branching, and since the branched polyethylene has a branch with a carbon number of not less than 2, the steric hindrance around the tertiary carbon atom of the branched polyethylene used in the present invention is theoretically greater than that of EPM. Taking the two factors into account, it can be determined that the crosslinking ability of the branched polyethylene used in the present invention is weaker than that of EPM and further weaker than that of EPDM. However, the actual crosslinking ability of the partially branched polyethylene used in the present invention is close to, and can even be equal to or better than that of the EPDM rubber. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a cross-linking reaction is more likely to occur. Having a secondary branch structure is a significant distinct of the branched polyethylene used in the preferred embodiment of the present invention from EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the main chains than the ethylene-propylene rubber, by which the concentration of stress can be effectively avoided, and better overall mechanical properties are expected to be achieved while a good crosslinking efficiency is effected.

In a further technical solution, the rubber matrix comprises, based on 100 parts by weight, a branched polyethylene with a content represented as A, in which 10≤A≤100 parts, an EPM with a content represented as B, in which 0≤B≤90 parts, and an EPDM with a content represented as C, in which 0≤C≤90 parts, where the branched polyethylene is an ethylene homopolymer having a degree of branching of 60-130 branches/1000 carbon atoms, a weight average molecular weight of 66,000-18,000, and a Mooney viscosity ML (1+4) at 125° C. of 6-102.

In a further technical solution, the rubber matrix comprises, based on 100 parts by weight, a branched polyethylene with a content represented as A, in which 10≤A≤100 parts, B parts of EPM and EPDM in total, in which 0≤B≤90 parts, where the branched polyethylene is an ethylene homopolymer having a degree of branching of 70-116 branches/1000 carbon atoms, a weight average molecular weight of 201,000-436,000, and a Mooney viscosity ML (1+4) at 125° C. of 23-101.

In a further technical solution, the rubber matrix comprises, based on 100 parts by weight, A parts of a branched polyethylene, in which 10≤A≤100 parts, B parts of EPM and EPDM in total, in which 0≤B≤90 parts, where the branched polyethylene is an ethylene homopolymer having a degree of branching of 80-105 branches/1000 carbon atoms, a weight average molecular weight of 250,000-400,000, and a Mooney viscosity ML (1+4) at 125° C. of 40-95.

In a further technical solution, the rubber matrix comprises, based on 100 parts by weight, A parts of a branched polyethylene, in which 10≤A≤100 parts, B parts of EPM and EPDM in total, in which 0≤B≤90 parts, where the branched polyethylene is an ethylene homopolymer having a degree of branching of 80-105 branches/1000 carbon atoms, a weight average molecular weight of 268,000-356,000, and a Mooney viscosity ML (1+4) at 125° C. of 42-80.

In a further technical solution, a third monomer of EPDM is preferably a diene monomer, particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic auxiliary crosslinking agent in the peroxide vulcanization to improve the crosslinking efficiency. This reduces the amount of the crosslinking agent and the auxiliary crosslinking agent required and the cost when they are added. The content in percentages by weight of the diene monomer relative to the ethylene-propylene rubber is preferably from 1% to 14%, more preferably from 3% to 10%, and further preferably from 4% to 7%.

In a further technical solution, the rubber composition further comprises auxiliary components, which comprise, based on 100 parts by weight of the rubber matrix, 1 to 3 parts of a stabilizer, 1 to 5 parts of polyethylene glycol, and 0 to 3 parts of a vulcanization accelerator.

In a further technical solution, the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the polyethylene glycol includes at least one of those polyethylene glycol having a molecular weight of 2000, 3400, and 4000.

In a further technical solution, the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

In a further technical solution, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a further technical solution, the auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, a metal salt of an unsaturated carboxylic acid, and sulfur. The metal salt of an unsaturated carboxylic acid includes at least one of zinc acrylate, zinc methacrylate, magnesium methacrylate, calcium methacrylate, and aluminum methacrylate.

In a further technical solution, the plasticizer comprises at least one of stearic acid, pine tar, motor oil, naphthenic oil, paraffin oil, coumarone, RX-80, paraffin, liquid polyisobutene, and dioctyl sebacate. Proper use of a plasticizer can increase the elasticity of the rubber compound and the plasticity suitable for process operation. In order to increase the adhesion, it is also preferred to use a tackifier such as pine tar, coumarone, RX-80, liquid polyisobutene and the like.

In a further technical solution, the metal oxide includes at least one of zinc oxide, and magnesia.

In a further technical solution, the reinforcing filler comprises at least one of carbon black, calcium carbonate, calcined clay, magnesium silicate, aluminium silicate, and magnesium carbonate.

In an embodiment of the present invention, in order to improve the adhesion of the rubber compound, the rubber composition may further comprise a tackifier. The pine tar, coumarone resin, RX-80, and liquid polyisobutene mentioned above for the plasticizer also have a tackifying effect. The liquid coumarone resin has a better tackifying effect than that of a solid coumarone resin. The tackifier can also be selected from the group consisting of C5 petroleum resin, C9 petroleum resin, hydrogenated rosin, terpene resin, alkyl phenolic resin, modified alkyl phenolic resin, alkylphenol-acetylene resin, and other commonly used tackifiers. The tackifier is usually used in an amount of not more than 30 parts by weight, further preferably not more than 10 parts by weight, and further preferably not more than 5 parts by weight, based on 100 parts by weight of the rubber matrix.

The crosslinking agent, the auxiliary crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction. The vulcanized rubber may also be simply referred to as a vulcanizate.

The present invention also provides a processing method for obtaining the rubber composition, which comprises the following steps:

(1) rubber mixing, comprising adding other components than the crosslinking system in the rubber composition sequentially to an internal mixer according to the parts by weight and mixing; then adding the crosslinking system, mixing uniformly, and discharging to obtain a rubber mix; and plasticating the rubber mix on an open mill, unloading the sheet, and standing for vulcanization later. The crosslinking system includes a crosslinking agent, an auxiliary crosslinking agent and also a vulcanization accelerator.

(2) vulcanization, comprising filling the rubber mix into a cavity of a mold, vulcanizing on a press vulcanizer by pressing, and releasing from the mold to obtain a vulcanized rubber.

The present invention also provides a conveyor belt comprising a working face cover rubber and a non-working face cover rubber. A tensile layer is provided between the working face cover rubber and the non-working face cover rubber, and at least one of the working face cover rubber and the non-working face cover rubber comprises the rubber composition.

The present invention also provides a method for producing a conveyor belt having a working face cover rubber comprising the rubber composition provided in the present invention. The production method comprises the following steps:

(1) rubber mixing process, comprising adding other components than the crosslinking system in the rubber composition sequentially to an internal mixer according to the parts by weight and mixing to obtain a masterbatch; standing the masterbatch, adding to an internal mixer, and mixing; then adding the crosslinking system, mixing uniformly, and discharging, to obtain a final rubber mix for use later, where the crosslinking system comprises a cross-linking agent, an auxiliary cross-linking agent, and also a vulcanization accelerator;

(2) calendering process, comprising: hot milling the rubber mix in a screw extruder, then supplying it to a calender, calendering, and heat preserving the sheet discharged for later us e;

(3) forming process, comprising: closely laminating the rubber sheet to a pre-formed rubberized canvas belt blank on a forming machine, forming a belt blank of a high-temperature resistant conveyor belt, then rolling up, and standing for vulcanization later;

(4) placing the formed conveyor belt blank in a press vulcanizer for vulcanization in stages; and (5) after vulcanization, trimming, inspecting, packaging, and storing.

The present invention also provides a cold resistant conveyor belt comprising a working face cover rubber and a non-working face cover rubber. A tensile layer is provided between the working face cover rubber and the non-working face cover rubber, and at least one of the working face cover rubber and the non-working face cover rubber comprises the rubber composition. The plasticizer in the rubber composition used comprises a cold-resistant plasticizer, and the cold-resistant plasticizer may be dioctyl sebacate in an amount of preferably 10 to 30 parts by weight.

The present invention also provides a static conductive conveyor belt comprising a working face cover rubber and a non-working face cover rubber. A tensile layer is provided between the working face cover rubber and the non-working face cover rubber, and at least one of the working face cover rubber and the non-working face cover rubber comprises the rubber composition. The reinforcing filler in the rubber composition used comprises at least one of conductive carbon black and graphite powder, and the conductive carbon black may be at least one selected from conductive furnace carbon black (CF), superconductive furnace carbon black (SCF), andextra conductive carbon black (XCF) and acetylene black (ACEF). The total amount of the conductive carbon black and(or) graphite powder is preferably 15 to 40 parts by weight.

The present invention also provides a tubular conveyor belt comprising an inner cover rubber and an outer cover rubber. A tensile layer is provided between the inner cover rubber and the outer cover rubber, and at least one of the inner cover rubber and the outer cover rubber comprises the rubber composition.

Compared with the prior art, the present invention has the beneficial effects that due to the completely saturated molecular structure of the branched polyethylene, the heat aging resistance is similar to that of EPM, and superior to that of EPDM, and vulcanization using a peroxide system can be adopted. The production process of the conveyor belt requires a rubber grade of medium-low Mooney viscosity. Branched polyethylene has more long branches than EPM or EPDM, and has a smaller hydrodynamic volume, i.e. lower Mooney viscosity, while the molecular weight is the same. Therefore, given that the requirement of medium-low Mooney viscosity is satisfied, higher molecular weight of branched polyethylene can be used, thus obtaining a higher mechanical strength. Moreover, since branched polyethylene has more branches on its molecular structure, and the branches has a certain length distribution and may have a number of secondary branch structures. The crosslinking point of the branched polyethylene could be generated on the tertiary carbon of the backbone or on the branched tertiary carbon of the secondary structure during the peroxide crosslinking. Therefore, the rubber network formed by the peroxide crosslinking of the branched polyethylene could have richer C—C bonding segments between the main chains than the ethylene-propylene rubber, which are similar to the polysulfide linkages in the sulfur vulcanization system, but have a much higher bond energy, and by which the concentration of stress could be effectively avoided, and better overall mechanical properties are expected to be achieved while a good cross-linking efficiency is effected. Therefore, when the rubber matrix comprises branched polyethylene, use of the rubber composition in the cover layer of the conveyor belt could effectively improve the shortcomings of the prior art, and to some extent solve the existing problem of low mechanical strength of the cover layer of the conveyor belt having ethylene-propylene rubber as the main rubber component.

DETAILED DESCRIPTION

The following examples are given to further illustrate the present invention, and not intended to limit the scope of the present invention. Some non-essential improvements and modifications made by the skilled person in the art based on the disclosure herein are still within the scope of the present invention.

To more clearly illustrate the embodiments of the present invention, the materials involved in the present invention are defined below.

The crosslinking system includes a crosslinking agent, an auxiliary crosslinking agent and also a vulcanization accelerator.

The EPM useful in the rubber matrix of the present invention preferably has a Mooney viscosity ML (1+4) at 125° C. of 30-55 and preferably has an ethylene content of 45%-60%. The EPDM used preferably has a Mooney viscosity ML (1+4) at 125° C. of 30 to 100, and preferably has an ethylene content of 55% to 75%. The third monomer is 5-ethylidene-2-norbornene, 5-vinyl-2-norbornene or dicyclopentadiene, and the content of the third monomer is 1%-7%.

The branched polyethylene can be obtained by the catalytic homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, as described in, without limitation, CN102827312A, CN101812145A, CN101531725A, CN104926962A, U.S. Pat. Nos. 6,103,658, and 6,660,677.

The branched polyethylene used is characterized by having a degree of branching of 60-130 branches/1000 carbon atoms, a weight average molecular weight of 66,000-518,000, and a Mooney viscosity ML (1+4) at 125° C. of 6-102. The degree of branching is measured by $^1$H NMR, and the molar percentages of various branches are measured by $^{13}$C NMR.

The details are shown in a table below:

| Branched polyethylene No. | Degree of branching | Methyl content/ % | Ethyl content/ % | Propyl content/ % | Butyl content/ % | Pentyl content/ % | Content of hexyl and higher branches/ % | Weight average molecular weight/ 10,000 | Molecular weight distribution | Mooney viscosity ML (1 + 4) at 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

Test Methods of Rubber Performances

1. Hardness test: The test is carried out using a hardness tester at room temperature in accordance with the national standard GB/T 531.1-2008.

2. Tensile strength and elongation at break performance test: The test is carried out with a type 2 dumbbell specimen using an electronic tensile tester at a tensile speed of 500 mm/min and a test temperature of 23±2° C. in accordance with the national standard GB/T528-2009.

3. Mooney viscosity test: The test is carried out in accordance with the national standard GB/T1232.1-2000, with a Mooney viscosity meter at a test temperature of 125° C. by preheating for 1 minute, and the test is continued for 4 minutes.

4. Hot air accelerated aging test: The test is carried out in a heat aging test chamber at 150° C. for 72 h in accordance with the national standard GB/T3512-2001.

5. DIN abrasion test: The test is carried out at a test temperature of 23±2° C. with a cylindrical vulcanized rubber specimen using a cylindrical drum abrasion machine having a diameter of 16±0.2 mm and a height of 8 mm in accordance with the national standard GB/T9867-1998.

6. Test of optimum vulcanization time Tc90: The test is carried out at 160° C. in a rotorless vulcanizer in accordance with the national standard GB/T16584-1996.

The vulcanization conditions in the following Examples 1 to 9 and Comparative Examples 1 and 2 include temperature: 160° C.; pressure: 16 MPa; and time Tc90+2 min.

Hereinafter, the present invention is further described with reference to specific examples.

A rubber composition comprises, in parts by weight, 100 parts of a rubber matrix. The rubber matrix comprises, in parts by weight, A parts of a branched polyethylene, in which 0<A≤100 parts, B parts of EPM, in which 0≤B<100 parts, and C parts of EPDM, in which 0≤C<100 parts; and based on 100 parts by weight of the rubber matrix, the rubber composition further comprises 1.5-9 parts of a crosslinking agent, 0.2-9 parts of an auxiliary crosslinking agent, 40-170 parts of a reinforcing filler, 6-93 parts of a plasticizer, and 3-25 parts of a metal oxide, where the branched polyethylene has a degree of branching of not less than 50 branches/1000 carbon atoms, a weight average molecular weight of not less than 50,000, and a Mooney viscosity ML (1+4) at 125° C. of not less than 2.

In a preferred embodiment, in 100 parts by weight of the rubber matrix, the content of the branched polyethylene is A, in which 10≤A≤100 parts; the content of the EPM is B, in which 0≤B≤90 parts; and the content of the EPDM is C, in which 0≤C≤90 parts. In a further preferred embodiment, the 100 parts by weight of the rubber matrix is exclusively branched polyethylene.

The branched polyethylene preferably has a degree of branching of 60-130 branches/1000 carbon atoms, a weight average molecular weight of 66,000-518,000, and a Mooney viscosity ML (1+4) at 125° C. of 6-102.

The rubber composition further comprises, based on 100 parts by weight of the rubber matrix, 1 to 3 parts of a stabilizer, 1 to 5 parts of polyethylene glycol, and 0 to 3 parts of a vulcanization accelerator.

The stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB). The polyethylene glycol comprises at least one of those polyethylene glycol having a molecular weight of 2000, 3400, and 4000.

The vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

The crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

The auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, zinc acrylate, zinc methacrylate, magnesium methacrylate, calcium methacrylate, aluminum methacrylate and sulfur.

The plasticizer comprises at least one of stearic acid, pine tar, motor oil, naphthenic oil, paraffin oil, coumarone, RX-80, paraffin, and liquid polyisobutene. The metal oxide comprises at least one of zinc oxide and magnesia.

The reinforcing filler comprises at least one of carbon black, calcium carbonate, calcined clay, magnesium silicate, aluminium silicate, and magnesium carbonate.

A processing method for obtaining the rubber composition comprises the following steps:

(1) rubber mixing, comprising: setting the temperature of an internal mixer to 70-120° C. and the rotor speed to 30-50 rpm, adding a rubber matrix, pre-pressing and mixing for 90 seconds; and adding zinc oxide, stearic acid and the anti-aging agent RD, and mixing for 1 min;

(2) then adding carbon black and paraffin oil to the rubber compound and mixing for 3 min;

(3) subsequently, adding 3 parts of a crosslinking agent and an auxiliary crosslinking agent, mixing for 2 min, and then discharging;

(4) plasticating the rubber mix on an open mill with a roll temperature of 50-70° C. to obtain a sheet, which is stood for 20 hours; and (5) after vulcanization, performing various tests after standing for 16 hrs.

The vulcanization conditions include temperature: 160° C.; pressure: 16 MPa; and time Tc90+2 min.

A conveyor belt comprises a working face cover rubber and a non-working face cover rubber. A tensile layer is provided between the working face cover rubber and the non-working face cover rubber, and both of the working face cover rubber and the non-working face cover rubber are formed with the rubber composition.

A method for producing the conveyor belt comprises the steps of:

(1) rubber mixing process: setting the temperature of an internal mixer to 70° C., and the rotor speed to 50 rpm; adding 100 parts of branched polyethylene, prepressing and mixing for 60 seconds; adding 10 parts of zinc oxide, 1 part of stearic acid, and 1 part of the anti-aging agent RD and mixing for 1 min; then adding 50 parts of carbon black N330, and 20 parts of paraffin oil SUNPAR2280 to the rubber compound, and mixing for 3 min; and finally, adding 3 parts of the crosslinking agent dicumyl peroxide (DCP). 1 part of the auxiliary crosslinking agent triallyl isocyanurate (TAIC), and 0.3 part of the auxiliary crosslinking agent sulfur, mixing for 2 min, and then discharging;

(2) calendering process, comprising: hot milling the rubber mix in a screw extruder, calendering in a calender, and then discharging a sheet, where the thickness of the sheet was controlled to 4.5-12 mm upon calendering and discharging the sheet, and heat preserving the sheet discharged for later use;

(3) forming process, comprising: closely laminating the rubber sheet to a pre-formed rubberized canvas belt blank on a forming machine, forming a belt blank of a high-temperature resistant conveyor belt, then rolling up, and vulcanizing after 4 h;

(4) placing the formed conveyor belt blank in a press vulcanizer for vulcanization in stages, where the vulcanization time on each plate is 25 min, the vulcanization pressure is 3 MPa, and the vulcanization temperature is 160° C.; and (5) after vulcanization, trimming, inspecting, packaging, and storing.

To test the rubber performance, the present invention is described in detail below by way of specific examples.

Example 1

Branched polyethylene No. PER-9 was used.
The processing steps of the rubber composition for test were as follows.

(1) Rubber mixing: The temperature of the internal mixer was set to 100° C., and the rotor speed was set to 50 rpm. 90 parts of EPDM and 10 parts of branched polyethylene were added, prepressed and mixed for 90 seconds. 5 parts of zinc oxide, 0.2 part of stearic acid, and 1 part of the anti-aging agent RD were then added, and mixed for 1 min. Then 60 parts of carbon black N330, and 25 parts of paraffin oil SUNPAR2280 were added to the rubber compound, and mixed for 3 min. Finally, 5 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 2

Branched polyethylene No. PER-8 was used.
The processing steps of the rubber composition for test were as follows.

(1) Rubber mixing: The temperature of the internal mixer was set to 90° C., and the rotor speed was set to 50 rpm. 80 parts of EPDM and 20 parts of branched polyethylene were added, prepressed and mixed for 90 seconds. 10 parts of zinc oxide and 2 parts of stearic acid were then added, and mixed for 1 min. Then 80 parts of carbon black N330, and 25 parts of paraffin oil SUNPAR2280 were added to the rubber compound, and mixed for 3 min. Finally, 1 part of the crosslinking agent dicumyl peroxide (DCP), 0.5 part of the crosslinking agent sulfur, 1.5 parts of the vulcanization accelerator, tetramethyl thiuram disulfide, and 1 part of the vulcanization accelerator tetramethyl thiuram monosulfide were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 3

Branched polyethylene No. PER-5 was used.
The processing steps of the rubber composition for test were as follows.

(1) Rubber mixing: The temperature of the internal mixer was set to 100° C., and the rotor speed was set to 50 rpm. 20 parts of EPM, 50 parts of EPDM and 30 parts of branched polyethylene were added, prepressed and mixed for 90 seconds. 15 parts of zinc oxide, 3 parts of magnesia, 3 parts of stearic acid, and 1 part of the anti-aging agent RD were then added, and mixed for 1 min. Then 50 parts of carbon black N330, and 10 parts of paraffin oil SUNPAR2280 were added to the rubber compound, and mixed for 3 min. Finally, 6 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 4

Branched polyethylene No. PER-4 was used.
The processing steps of the rubber composition for test were as follows.

(1) Rubber mixing: The temperature of the internal mixer was set to 70° C., and the rotor speed was set to 50 rpm. 50 parts of EPDM and 50 parts of branched polyethylene were added, prepressed and mixed for 90 seconds. 10 parts of zinc oxide, 1 part of stearic acid, and 1 part of the anti-aging agent RD were then added, and mixed for 1 min. Then 50 parts of carbon black N330, and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 5

Branched polyethylene No. PER-3 was used.
The processing steps of the rubber composition for test were as follows.

(1) Rubber mixing: The temperature of the internal mixer was set to 80° C., and the rotor speed was set to 50 rpm. 20 parts of EPDM and 80 parts of branched polyethylene were added, prepressed and mixed for 90 seconds. 7 parts of zinc oxide, 1.5 parts of stearic acid, 2 parts of polyethylene glycol PEG 4000, and 1 part of the anti-aging agent RD were added and mixed for 1 min. Then 100 parts of carbon black N330, 20 parts of calcium carbonate and 60 parts of paraffin oil SUNPAR2280 were added to the rubber compound, and mixed for 3 min. Finally, 6 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 6

Branched polyethylene No. PER-4 was used.

The processing steps of the rubber composition for test were as follows.

(1) Rubber mixing: The temperature of the internal mixer was set to 70° C., and the rotor speed was set to 50 rpm. 100 parts of branched polyethylene was added, prepressed and mixed for 90 seconds. 10 parts of zinc oxide, 1 part of stearic acid, and 1 part of the anti-aging agent RD were then added, and mixed for 1 min. Then 50 parts of carbon black N330, and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 7

Branched polyethylene No. PER-5 was used.

The processing steps of the rubber composition for test were as follows.

(1) Rubber mixing: The temperature of the internal mixer was set to 70° C., and the rotor speed was set to 50 rpm. 50 parts of EPM and 50 parts of branched polyethylene were added, prepressed and mixed for 90 seconds. 10 parts of zinc oxide, 3 parts of magnesia, 2 parts of stearic acid, and 1 part of the anti-aging agent RD were added and mixed for 1 min. Then 50 parts of carbon black N330, and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 8

Branched polyethylene Nos. PER-1 and PER-6 were used.

The processing steps of the rubber composition for test were as follows.

(1) Rubber mixing: The temperature of the internal mixer was set to 70° C., and the rotor speed was set to 50 rpm. 80 parts of PER-6 and 20 parts of PER-1 were added, prepressed and mixed for 90 seconds. 3 parts of zinc oxide, and 1 part of the anti-aging agent RD were added and mixed for 1 min. Then 40 parts of carbon black N330, and 6 parts of paraffin oil SUNPAR2280 were added to the rubber compound, and mixed for 3 min. Finally, 2 parts of the crosslinking agent dicumyl peroxide (DCP), and 0.2 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 9

Branched polyethylene Nos. PER-2 and PER-7 were used.

The processing steps of the rubber composition for test were as follows.

(1) Rubber mixing: The temperature of the internal mixer was set to 70° C., and the rotor speed was set to 50 rpm. 70 parts of PER-7 and 30 parts of PER-2 were added, prepressed and mixed for 90 seconds. 20 parts of zinc oxide, 5 parts of magnesia, 3 parts of stearic acid, and 2 parts of the anti-aging agent RD were added and mixed for 1 min. Then 120 parts of carbon black N330, 50 parts of calcium carbonate and 90 parts of paraffin oil SUNPAR2280 were added to the rubber compound, and mixed for 3 min. Finally, 9 parts of the crosslinking agent dicumyl peroxide (DCP), 2 parts of the auxiliary crosslinking agent triallyl isocyanurate (TAIC) and 7 parts of the auxiliary crosslinking agent 1,2-polybutadiene were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 1

The processing steps were as follows.

(1) Rubber mixing: The temperature of the internal mixer was set to 70° C., and the rotor speed was set to 50 rpm. 100 parts of EPDM was added, prepressed and mixed for 90 seconds. 10 parts of zinc oxide, 1 part of stearic acid, and 1 part of the anti-aging agent RD were added and mixed for 1 min. Then 50 parts of carbon black N330, and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 2

The processing steps were as follows.

(1) Rubber mixing: The temperature of the internal mixer was set to 70° C., and the rotor speed was set to 50 rpm. 50 parts of EPM and 50 parts of EPDM were added, prepressed and mixed for 90 seconds. 10 parts of zinc oxide, 3 parts of magnesia, 2 parts of stearic acid, and 1 part of the anti-aging agent RD were added and mixed for 1 min. Then 50 parts of carbon black N330, and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparison of the tested performances are shown in a table below.

| Test Item | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Hardness | 62 | 65 | 67 | 61 | 71 | 63 | 63 | 59 | 68 | 58 | 62 |
| Tensile strength/MPa | 14.8 | 15.7 | 15.2 | 15.9 | 18.5 | 20.8 | 17.4 | 14.8 | 13.7 | 14.4 | 14.6 |
| Elongation at break/% | 334 | 389 | 347 | 511 | 305 | 586 | 613 | 428 | 232 | 395 | 587 |
| DIN Relative abrasion volume/mm$^3$ | 103 | 119 | 100 | 104 | 97 | 96 | 117 | 115 | 76 | 111 | 113 |
| After aging (at 150° C. for 70 h) | | | | | | | | | | | |
| Hardness | 63 | 68 | 68 | 60 | 72 | 61 | 61 | 60 | 71 | 60 | 63 |
| Retention rate of tensile strength/% | 96 | 83 | 99 | 90 | 95 | 92 | 95 | 96 | 77 | 86 | 91 |
| Retention rate of elongation at break/% | 85 | 67 | 112 | 88 | 115 | 89 | 89 | 97 | 79 | 88 | 88 |

Performance Data Analysis

By comparison of Example 4, Example 6 and Comparative Example 1, it can be found that as the content of branched polyethylene in the rubber composition increases, the tensile strength increases significantly, the elongation at break increases, the abrasion resistance becomes better, and the thermal stability has no significant changes. The same trend of change can also be found by comparison of Example 7 with Comparative Example 2. Therefore, the use of branched polyethylene as a rubber component in the cover rubber of the conveyor belt facilitates the improvement of the mechanical strength and abrasion resistance of the cover rubber, so that the heat-resistant conveyor belt can be used in more scenarios.

Example 10

A high temperature resistant conveyor belt comprises a cored tensile canvas provided between the working face cover rubber and the non-working face cover rubber, which are formed and vulcanized into one piece firmly together as a whole.

The composition and mixing ratio of the working face cover rubber of the high temperature resistant conveyor belt are in parts, and the production method comprises the following steps.

(1) Rubber Mixing Process:

The temperature of the internal mixer was set to 70° C., and the rotor speed was set to 50 rpm. 100 parts of branched polyethylene PER-3 was added, prepressed and mixed for 60 seconds. 10 parts of zinc oxide, 1 part of stearic acid, and 1 part of the anti-aging agent RD were added and mixed for 1 min. Then 50 parts of carbon black N330, and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged.

(2) Calendering Process:

The rubber mix was hot milled in a screw extruder, then supplied to a calender, and calendered, and the sheet was discharged for later use. The thickness of the sheet was controlled to 4.5-12 mm upon calendering and discharging the sheet. The discharged sheet was heat preserved for later use.

(3) Forming Process:

The rubber sheet was closely laminated to a pre-formed rubberized canvas belt blank on a forming machine, and formed into a belt blank of a high-temperature resistant conveyor belt, which was then rolled up, and vulcanized after 4 h.

(4) Vulcanization Process:

The formed conveyor belt blank was placed in a press vulcanizer for vulcanization in stages, where the vulcanization time on each plate was 25 min, the vulcanization pressure was 3 MPa, and the vulcanization temperature was 160° C.

(5) Trimming and Inspection:

After vulcanization, the belt was trimmed, inspected, packaged, and stored.

Example 11

A cold resistant conveyor belt is produced through a process comprising the following steps.

(1) Rubber Mixing Process:

The temperature of the internal mixer was set to 70° C., and the rotor speed was set to 50 rpm. 100 parts of branched polyethylene PER-3 was added, prepressed and mixed for 60 seconds. 5 parts of zinc oxide, 1 part of stearic acid, and 1 part of the anti-aging agent RD were added and mixed for 1 min. Then 60 parts of carbon black N330, 5 parts of paraffin oil SUNPAR2280, and 15 parts of dioctyl sebacate were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged.

(2) Calendering Process:

The rubber mix was hot milled in a screw extruder, then supplied to a calender, and calendered, and the sheet was discharged for later use. The thickness of the sheet was controlled to 4.5-12 mm upon calendering and discharging the sheet. The discharged sheet was heat preserved for later use.

(3) Forming Process:

The rubber sheet, as a cover rubber, was closely laminated to a pre-formed rubberized canvas belt blank on a forming machine, and formed into a belt blank of a cold resistant conveyor belt, which was then rolled up, and vulcanized after 4 h.

(4) Vulcanization Process:

The formed conveyor belt blank was placed in a press vulcanizer for vulcanization in stages, where the vulcanization time on each plate was 25 min, the vulcanization pressure was 2.5 MPa, and the vulcanization temperature was 160° C.

(5) Trimming and Inspection:

After vulcanization, the belt was trimmed, inspected, packaged, and stored.

Example 12

A static conductive conveyor belt is produced through a process comprising the following steps.

(1) Rubber Mixing Process:

The temperature of the internal mixer was set to 70° C., and the rotor speed was set to 50 rpm. 100 parts of branched polyethylene PER-3 was added, prepressed and mixed for 60 seconds. 5 parts of zinc oxide, 1 part of stearic acid, and 1 part of the anti-aging agent RD were added and mixed for 1 min. Then 40 parts of carbon black N330, 20 parts of acetylene black and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged.

(2) Calendering Process:

The rubber mix was hot milled in a screw extruder, then supplied to a calender, and calendered, and the sheet was discharged for later use. The thickness of the sheet was controlled to 4.5-12 mm upon calendering and discharging the sheet. The discharged sheet was heat preserved for later use.

(3) Forming Process:

The rubber sheet, as a cover rubber, was closely laminated to a pre-formed rubberized canvas belt blank on a forming machine, and formed into a belt blank of a static conductive conveyor belt, which was then rolled up, and vulcanized after 4 h.

(4) Vulcanization Process:

The formed conveyor belt blank was placed in a press vulcanizer for vulcanization in stages, where the vulcanization time on each plate was 25 min, the vulcanization pressure was 2.5 MPa, and the vulcanization temperature was 160° C.

(5) Trimming and Inspection:

After vulcanization, the belt was trimmed, inspected, packaged, and stored.

Example 13

A high-strength high-temperature resistant conveyor belt is produced through a process comprising the following steps.

(1) Rubber Mixing Process:

The temperature of the internal mixer was set to 100° C., and the rotor speed was set to 50 rpm. 100 parts of branched polyethylene PER-10 was added, prepressed and mixed for 60 seconds. 5 parts of zinc oxide, 1 part of stearic acid, 3 parts of coumarone resin and 1 part of the anti-aging agent RD were added and mixed for 1 min. Then 60 parts of carbon black N330 and 20 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged.

(2) Calendering Process:

The rubber mix was hot milled in a screw extruder, then supplied to a calender, and calendered, and the sheet was discharged for later use. The thickness of the sheet was controlled to 4.5-12 mm upon calendering and discharging the sheet. The discharged sheet was heat preserved for later use.

(3) Forming Process:

The rubber sheet, as a cover rubber, was closely laminated to a pre-formed rubberized canvas belt blank on a forming machine, and formed into a belt blank of a high-temperature resistant conveyor belt, which was then rolled up, and vulcanized after 4 h.

(4) Vulcanization Process:

The formed conveyor belt blank was placed in a press vulcanizer for vulcanization in stages, where the vulcanization time on each plate was 25 min, the vulcanization pressure was 2.5 MPa, and the vulcanization temperature was 160° C.

(5) Trimming and Inspection:

After vulcanization, the belt was trimmed, inspected, packaged, and stored.

In this example, the tensile strength of the cover rubber of the conveyor belt reaches 27.3 MPa.

Example 14

A high-strength high-temperature resistant conveyor belt having a cover rubber and a bonding core rubber formed with the rubber composition provided in the present invention is produced through a process comprising the following steps.

(1) Rubber Mixing Process:

Mixing of cover rubber: The temperature of the internal mixer was set to 90° C., and the rotor speed was set to 50 rpm. 100 parts of branched polyethylene PER-12 was added, prepressed and mixed for 60 seconds. 8 parts of zinc oxide, 1 part of stearic acid, 3 parts of coumarone resin and 1 part of the anti-aging agent RD were added and mixed for 1 min. Then 60 parts of carbon black N330 and 10 parts of paraffin oil SUNPAR2280 were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged.

Mixing of Bonding Core Rubber:

The temperature of the internal mixer was set to 95° C., and the rotor speed was set to 50 rpm. 100 parts of branched polyethylene PER-11 was added, prepressed and mixed for 60 seconds. 5 parts of zinc oxide, 1 part of stearic acid, 2 parts of liquid coumarone resin, 2 parts of pine tar, 2 parts of modified alkyl phenolic resin TKM-M and 1 part of the anti-aging agent RD were added and mixed for 1 min. Then 60 parts of carbon black N330, 10 parts of paraffin oil SUNPAR2280 and 5 parts of liquid polyisobutene were added to the rubber compound, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged.

(2) Calendering Process:

The rubber mix was hot milled in a screw extruder, then supplied to a calender, and calendered, and the sheet was discharged for later use. The thickness of the sheet was controlled to 4.5-12 mm upon calendering and discharging the sheet. The discharged sheet was heat preserved for later use.

(3) Forming Process:

The rubber sheet, as a cover rubber, was closely laminated to a pre-formed canvas belt blank comprising a bonding core rubber on a forming machine, and formed into a belt blank of a high-temperature resistant conveyor belt, which was then rolled up, and vulcanized after 4 h.

(4) Vulcanization Process:

The formed conveyor belt blank was placed in a press vulcanizer for vulcanization in stages, where the vulcanization time on each plate was 25 min, the vulcanization pressure was 2.5 MPa, and the vulcanization temperature was 160° C.

(5) Trimming and Inspection:

After vulcanization, the belt was trimmed, inspected, packaged, and stored.

In this example, the tensile strength of the cover rubber of the conveyor belt reaches 29.5 MPa.

The conveyor belts of Examples 13 and 14 have a cover rubber with a tensile strength close to that of natural rubber, and have an aging resistance equivalent to or superior to ethylene-propylene rubber, thus being a high-temperature resistant and high-strength conveyor belt.

The superiority of the branched polyethylene in cross-linking ability is illustrated through the comparison of the crosslinking performance tests of Examples 15 and 16 and Comparative Example 3.

In Example 15, the rubber matrix comprises 100 parts of PER-12. In Example 16, the rubber matrix comprises 50 parts of PER-12 and 50 parts of EPDM (having an ML(1+4) at 125° C. of 60, an ethylene content of 68%, and an ENB content of 4.8%). In Comparative Example 3, the rubber matrix comprises 100 parts of EPDM used in Example 16. The rest of the formation is the same.

The processing steps of the three rubber compositions were as follows.

(1) Mixing: The temperature of the internal mixer was set to 80° C., and the rotor speed was set to 50 rpm. A rubber matrix was added, pre-pressed and mixed for 90 seconds. 10 parts of zinc oxide, and 1 part of stearic acid were added, and mixed for 1 min.

(2) Then 70 parts of carbon black N550, 15 parts of calcium carbonate, and 45 parts of paraffin oil were added to the rubber compound, and mixed for 3 min.

(3) Finally, 3 parts of the crosslinking agent BIPB and 1 part of the auxiliary crosslinking agent TAIC were added, and mixed for 2 min, and then discharged.

(4) The rubber mix was plasticated on an open mill with a roll temperature of 60° C. to obtain a sheet having a thickness of about 2.5 mm, which was stood for 20 hours and then tested for the vulcanization performance.

The test condition includes 30 min at 175° C. The test results are shown below.

|  | Example 15 | Example 16 | Comparative Example 3 |
|---|---|---|---|
| ML, dN · m | 1.24 | 1.03 | 0.55 |
| MH, dN · m | 11.81 | 11.24 | 11.03 |
| MH-ML, dN · m | 10.57 | 10.21 | 10.48 |
| Tc90, min | 6.5 | 7.3 | 8.0 |

The rubber composition of Example 15 has the shortest Tc90, and the highest MH-ML value, indicating that the branched polyethylene used in this example is better in cross-linking ability than conventional EPDM.

Use of the rubber composition of the present invention in the field of conveyor belts can greatly expand the scope of application of the high-temperature resistant conveyor belts and optimize the industrial structure of the conveyor belts.

What is claimed is:

1. A conveyor belt, comprising a working face cover rubber, a non-working face cover rubber, and a tensile layer being provided between the working face cover rubber and the non-working face cover rubber, wherein at least one of the working face cover rubber and the non-working face cover rubber comprises rubber compound formed from a rubber composition comprising a rubber matrix and essential components, wherein, based on 100 parts by weight of the rubber matrix, the rubber matrix comprises,
   a branched polyethylene with a content represented as A, in which 0<A≤100 parts,
   an EPM with a content represented as B, in which 0≤B<100 parts, and
   an EPDM with a content represented as C, in which 0≤C<100 parts;
   wherein based on 100 parts by weight of the rubber matrix, the essential components comprise 1.5-9 parts of a crosslinking agent, 0.2-9 parts of an assistant crosslinking agent, 40-170 parts of a reinforcing filler, 6-93 parts of a plasticizer, and 3-25 parts of a metal oxide, and
   wherein the branched polyethylene comprises an ethylene homopolymer having a branching degree of from about 60 to 99 branches/1000 carbon atoms, a weight average molecular weight of from 66,000 to 518,000, and a Mooney viscosity ML (1+4) at 125° C. of from 6 to 102.

2. The conveyor belt according to claim 1, wherein the ethylene homopolymer has a branching degree of from 60 to 94 branches/1000 carbon atoms.

3. The conveyor belt according to claim 1, wherein the ethylene homopolymer has a branching degree of from 60 to 90 branches/1000 carbon atoms.

4. The conveyor belt according to claim 1, wherein the ethylene homopolymer has a branching degree of from 60 to 87 branches/1000 carbon atoms.

5. The conveyor belt according to claim 1, wherein the ethylene homopolymer has a branching degree of from 60 to 82 branches/1000 carbon atoms.

6. The conveyor belt according to claim 1, wherein the ethylene homopolymer has a branching degree of from 60 to 70 branches/1000 carbon atoms.

7. The conveyor belt according to claim 1, wherein the ethylene homopolymer has a branching degree of 60 branches/1000 carbon atoms, 70 branches/1000 carbon atoms, 82 branches/1000 carbon atoms, 87 branches/1000 carbon atoms, 90 branches/1000 carbon atoms, 94 branches/1000 carbon atoms, or 99 branches/1000 carbon atoms.

8. The conveyor belt according to claim 1, wherein the ethylene homopolymer has a branching degree of about 60 branches/1000 carbon atoms, about 70 branches/1000 carbon atoms, about 82 branches/1000 carbon atoms, about 87 branches/1000 carbon atoms, about 90 branches/1000 carbon atoms, 94 branches/1000 carbon atoms, or 99 branches/1000 carbon atoms.

9. The conveyor belt according to claim 1, wherein the rubber matrix comprises, in parts by weight, 100 parts of the branched polyethylene; and based on 100 parts by weight of the rubber matrix, the essential components comprise 1.5 to 9 parts of a crosslinking agent, 0.2-9 parts of an assistant crosslinking agent, 40 to 170 parts of a reinforcing filler, 6-93 parts of a plasticizer, and 3-25 parts of a metal oxide.

10. The conveyor belt according to claim 1, wherein, in 100 parts by weight of the rubber matrix, the content of the branched polyethylene is represented as A, in which $10 \leq A \leq 100$ parts, the content of the EPM is represented as B, in which $0 \leq B \leq 90$ parts, and the content of the EPDM is represented as C, in which $0 \leq C \leq 90$ parts.

11. The conveyor belt according to claim 1, wherein, the rubber composition further comprises, based on 100 parts by weight of the rubber matrix, 1 to 3 parts of a stabilizer, 1 to 5 parts of polyethylene glycol, and 0 to 3 parts of a vulcanization accelerator.

12. The conveyor belt according to claim 11, wherein, the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

13. The conveyor belt according to claim 11, wherein, the polyethylene glycol comprises at least one of those polyethylene glycol having a molecular weight of 2000, 3400, and 4000.

14. The conveyor belt according to claim 11, wherein, the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

15. The conveyor belt according to claim 1, wherein, the crosslinking agent comprises a peroxide crosslinking agent and sulfur, wherein, the peroxide crosslinking agent comprises at least one of di-tert-butyl peroxide, dicumyl peroxide, tert-butyl cumyl peroxide, 1,1-di-tert-butyl peroxide-3, 3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

16. The conveyor belt according to claim 1, wherein, the assistant crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, a metal salt of an unsaturated carboxylic acid, and sulfur.

17. The conveyor belt according to claim 1, wherein, the plasticizer comprises at least one of stearic acid, pine tar, motor oil, naphthenic oil, paraffin oil, coumarone, paraffin, liquid polyisobutene, and dioctyl sebacate; the metal oxide comprises at least one of zinc oxide and magnesia; the reinforcing filler comprises at least one of carbon black, calcium carbonate, calcined clay, magnesium silicate, aluminum silicate, and magnesium carbonate.

18. The conveyor belt according to claim 1, wherein, the conveyor belt is a cold resistant conveyor belt, which comprises a working face cover rubber, a non-working face cover rubber and a tensile layer being provided between the working face cover rubber and the non-working face cover rubber, wherein, the rubber compound used for the working face cover rubber comprises the rubber composition, and the plasticizer in the rubber composition comprises a cold-resistant plasticizer.

19. The conveyor belt according to claim 1, wherein, the conveyor belt is a static-conducting conveyor belt, which comprises an inner cover rubber, an outer cover rubber, and a tensile layer being provided between the inner cover rubber and the outer cover rubber, wherein, the rubber compound used for at least one of the inner cover rubber and the outer cover rubber comprises the rubber composition, and the reinforcing filler in the rubber composition comprises at least one of conductive carbon black and graphite powder.

* * * * *